United States Patent
Vasireddy et al.

(10) Patent No.: US 8,549,628 B2
(45) Date of Patent: Oct. 1, 2013

(54) METHOD AND APPARATUS TO MEASURE THE SECURITY OF A SYSTEM, NETWORK, OR APPLICATION

(75) Inventors: S. Rao Vasireddy, Holmdel, NJ (US); Uma Chandrashekhar, Morganville, NJ (US); Suhasini Sabnis, Marlboro, NJ (US); Andrew R. McGee, Toms River, NJ (US); Carlos Solari, Shenandoah, VA (US)

(73) Assignee: Alcatel Lucent, Paris (FR)

( * ) Notice: Subject to any disclaimer, the term of this patent is extended or adjusted under 35 U.S.C. 154(b) by 916 days.

(21) Appl. No.: 12/618,482

(22) Filed: Nov. 13, 2009

(65) Prior Publication Data
US 2010/0257134 A1  Oct. 7, 2010

Related U.S. Application Data

(60) Provisional application No. 61/212,062, filed on Apr. 7, 2009.

(51) Int. Cl.
*G06F 21/50* (2013.01)

(52) U.S. Cl.
USPC .......... 726/22; 726/4; 726/23; 726/24; 726/25

(58) Field of Classification Search
USPC ........................................................ 726/22
See application file for complete search history.

(56) References Cited

U.S. PATENT DOCUMENTS

| | | | |
|---|---|---|---|
| 6,298,445 B1 * | 10/2001 | Shostack et al. | 726/25 |
| 6,883,101 B1 * | 4/2005 | Fox et al. | 726/25 |
| 6,971,026 B1 * | 11/2005 | Fujiyama et al. | 726/25 |
| 7,257,630 B2 * | 8/2007 | Cole et al. | 709/224 |
| 7,523,504 B2 * | 4/2009 | Shah | 726/25 |
| 7,809,670 B2 * | 10/2010 | Lee et al. | 706/59 |
| 8,095,984 B2 * | 1/2012 | McFarlane et al. | 726/25 |
| 8,185,955 B2 * | 5/2012 | Cangini et al. | 726/23 |
| 8,239,951 B2 * | 8/2012 | Lotem et al. | 726/25 |
| 2003/0154269 A1 * | 8/2003 | Nyanchama et al. | 709/223 |
| 2004/0143753 A1 * | 7/2004 | Hernacki et al. | 713/200 |
| 2006/0026688 A1 * | 2/2006 | Shah | 726/25 |
| 2007/0067847 A1 * | 3/2007 | Wiemer et al. | 726/25 |

OTHER PUBLICATIONS

NPL: "ITU-T X-805", Oct. 2003.*
ITU-T X-805, Oct. 2003.*
The Bell Labs Security Framework: Making the Case for End-to-End Wi-Fi Security; 2007.*

* cited by examiner

*Primary Examiner* — Kambiz Zand
*Assistant Examiner* — Yonas Bayou
(74) *Attorney, Agent, or Firm* — Kramer & Amado P.C.

(57) ABSTRACT

Various exemplary embodiments relate to a method and related security evaluation system including one or more of the following: determining, at the security evaluation system, a plurality of security dimensions to be evaluated for the target system; determining a reference value for each of the plurality of security dimensions, wherein each reference value is representative of a minimum target value for the associated security dimension of the target system; evaluating the security of the target system to generate an actual value for each of the plurality of security dimensions; and generating a security index representation that displays the reference value and the actual value of each of the plurality of security dimensions for the target system.

17 Claims, 5 Drawing Sheets

| PRIMATIVE ID | TITLE | DESCRIPTION |
|---|---|---|
| 0 | MD5 CHECKSUM | ALL DATA MUST MATCH AN MD5 CHECKSUM BEFORE BEING USED |
| 1 | ID AND PASSWORD | IDENTIFICATION AND AUTHENTICATION REQUIRED FOR ACCESS |
| 2 | ID CARD | USERS MUST VERIFY IDENTITY BY SWIPING A PERSONAL IDENTIFICATION CARD |
| 3 | DATA ENCRYPTION | ALL DATA STORED ON THE SYSTEM IS ENCRYPTED |
| ... | ... | ... |

| RULE ID | PRIMATIVE ID | DIMENSION | EFFECT |
|---|---|---|---|
| 0 | 0 | DATA INTEGRITY | +0.2 |
| 1 | 1 | ACCESS CONTROL | +0.1 |
| 2 | 1 | AUTHENTICATION | +0.15 |
| 3 | 2 | AUTHENTICATION | +0.15 |
| 4 | 2 | AVAILABILITY | −0.05 |
| 5 | 3 | PRIVACY | +0.05 |
| 6 | 3 | DATA CONFIDENTIALITY | +0.4 * LEVEL |
| ... | ... | ... | ... |

METHOD AND APPARATUS TO MEASURE THE SECURITY OF A SYSTEM, NETWORK, OR APPLICATION

CROSS-REFERENCE TO RELATED APPLICATIONS

This application claims priority to Provisional Application Ser. No. 61/212,062, filed on Apr. 7, 2009, the entire disclosure of which is incorporated herein by reference.

TECHNICAL FIELD

Various exemplary embodiments relate generally to security evaluation.

BACKGROUND

One of the most important concerns in virtually all software/firmware and computer-based systems is security. Customers demand assurance that, while using a particular system, their information and transactions are safe, and that the wrong users are not given access or able to perform unauthorized actions. In order to satisfy diverse security needs, various security technologies, such as strong encryption and authentication methods, are continually developed. However, while manufacturers may promote the various security features implemented in a system, this may mean next to nothing to an average customer without technical knowledge of the features. Even systems engineers may have difficulty seeing the "big picture" when determining which security features to implement in a system. In the end, the question that must be answered is, "How secure is this system?"

Representing security in terms of a single number does not provide the granularity needed to secure the system. In contrast, a single number or measure may be used to accurately convey the throughput of a network card: a network card may support transfer speeds of, for example, 10, 100, or 1000 megabits per second. A single number or measure would be almost meaningless with regard to system security because there are many distinct facets of security that are likely to be relevant. In most cases, a single number could not capture the entire picture as it would be unable to convey the particular strengths and, more importantly, weaknesses of a system's security.

As an example of the numerous facets encompassed by the term "security," international standard ITU-T X.805, incorporated herein by reference, defines eight "security dimensions," each describing a separate security concern. Privacy and data integrity are two examples of these security dimensions. ITU-T X.805 also explains that each security dimension is applicable on each of three security planes as well as each of three security layers. Each security dimension provides the necessary granularity to measure security in a repeatable way over and above the traditional industry known parameters CIA (confidentiality, integrity, availability) or AIC (availability, integrity or confidentiality). Security layers describe the area-of-focus and represent the assets within the equipment or systems hierarchy and include the infrastructure, services, and applications layers. Security planes describe the types of activities occurring in a system and include end-user, control/signaling, and management planes. Thus, according to ITU-T X.805, there are 72 dimension-layer-plane combinations which are relevant to system security and should be taken into account for a complete security assessment.

In view of the foregoing, it would be desirable to reliably estimate and convey the security level of an actual or planned system. In particular, it would be desirable to present an estimation of system security in an intuitive and repeatable manner while also conveying the particular security strengths and weaknesses of the system. It would also be desirable to aid system designers in determining which security features should be implemented in a particular system and the effects of such security features on the overall security of the system.

SUMMARY

In light of the present need for a system that can reliably estimate and convey the security level of an actual or planned computer system, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method and related security evaluation system including one or more of the following: determining, at the security evaluation system, a plurality of security dimensions to be evaluated for the target system; determining a reference value for each of the plurality of security dimensions, wherein each reference value is representative of a minimum target value for the associated security dimension of the target system; evaluating the security of the target system to generate an actual value for each of the plurality of security dimensions; and generating a security index representation that displays the reference value and the actual value of each of the plurality of security dimensions for the target system.

It should be apparent that, in this manner, various exemplary embodiments enable the generation of a detailed and intuitive representation of the level of security offered by a particular system. In particular, by evaluating how well the applicable security dimensions for a particular system are implemented, the security evaluation method/apparatus will convey the relative strengths and weaknesses of the target system while also giving the user an idea of the system's overall security. Thus, various exemplary embodiments enable a security evaluation system to reliably estimate and convey the security level of an actual or planned computer system.

BRIEF DESCRIPTION OF THE DRAWINGS

In order to better understand various exemplary embodiments, reference is made to the accompanying drawings, wherein:

FIG. 4 is a schematic diagram of an exemplary data arrangement for storing a plurality of security primitives;

FIG. 5 is a schematic diagram of an exemplary data arrangement for storing a plurality of security index rules;

DETAILED DESCRIPTION

Figure 1:
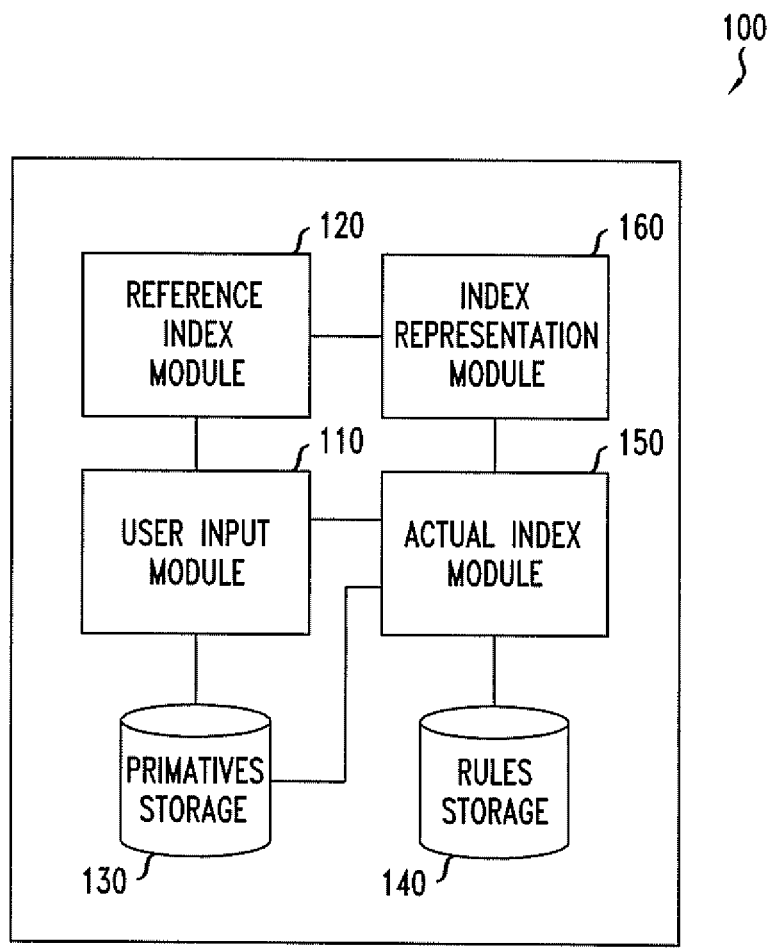
FIG. 1 is a schematic diagram of an exemplary security evaluation system.

Referring now to the drawings, in which like numerals refer to like components or steps, there are disclosed broad aspects of various exemplary embodiments.

FIG. 1 is a schematic diagram of an exemplary security evaluation system 100. Exemplary security evaluation system 100 may include a user input module 110, a reference index module 120, a primitives storage 130, a rules storage 140, an actual index module 150, and an index representation module 160.

User input module 110 may include hardware and/or executable instructions on a machine-readable storage medium configured to receive indications of a number of security primitives from a user. For example, user input module 110 may include a keyboard and/or a mouse. By utilizing the user input module 110, a user may specify a plurality of security primitives describing a number of security features, either currently implemented or to be implemented, in the system under evaluation. These security primitives may be pre-determined based on the technology and operating environment of the system under evaluation. In various alternative embodiments, user input module 110 may further receive other user input such as, for example, security dimensions to be tested or reference values for each security dimension.

Various alternative embodiments allow for the user to indicate, via user input module 110, the level to which each security primitive is implemented or to be implemented. For example, a user evaluating a system using RSA encryption for stored data might indicate that a "Data Encryption" primitive is 100% or "fully" implemented. Further, if the system instead uses only a simple substitution cipher for stored data, the user might indicate that the same "Data Encryption" primitive is only 10% or "partially" implemented. If no data encryption is used, the user may indicate the "Data Encryption" primitive as 0% or not implemented at all. The user may further be required to provide a description and proof of a partial or non-implementation via detailed comments and references before the user input module 110 may proceed to the next primitive.

Reference index module 120 may include hardware and/or executable instructions on a machine-readable storage medium configured to determine at least one reference security index for the system under evaluation. Reference index module 120 may determine a reference security level for each security dimension to be evaluated. The relationship of each reference security level to each other may be pre-defined and may be chosen based on the technology and/or operating environment of the target system. Each reference value may represent, for example, the minimum acceptable security level for the associated dimension or the security level for an alternate version of the system under evaluation. In various embodiments, reference index module 120 may determine multiple reference values for each security dimension. Reference index module 120 may, for example, determine a low reference value indicating the minimum acceptable security level for a security dimension, a high reference value indicating an optimal security level for a security dimension, and a previous release reference value indicating the security level of a previous version of the system under evaluation.

Reference index module 120 may determine each reference value by any method known to those of skill in the art, including but not limited to, receiving reference values from the user via user input module 110, reading an external data file (not shown) containing the reference values, or performing/receiving an evaluation of a different system. Additionally or alternatively, reference index module 120 may calculate a reference security level by evaluating factors such as the maximum and possible implementation levels, the degree of impact a failure in the security dimension would have at a particular implementation level, the frequency of such a failure at a particular implementation level, and/or the likelihood of such a failure occurring at a particular implementation level. Additional factors may also be taken into account when calculating a reference security level.

Primitives storage 130 may be any machine-readable medium capable of storing a number of security primitives to be selected by a user as descriptive of a system under evaluation. As will be described in further detail below with reference to FIG. 4, each security primitive may identify a security feature that may be implemented in a given system.

Rules storage 140 may be any machine-readable medium capable of storing a number of rules for evaluating each security dimension. As will be described in further detail below with reference to FIG. 5, each rule may identify the effect the selection of each primitive will have on a number of security dimensions.

Actual index module 150 may include hardware and/or executable instructions on a machine-readable storage medium configured to determine an actual security level for each of the security dimensions to be evaluated. In determining these security levels, actual index module 150 may receive a list of primitives selected by the user from user input module 110. Actual index module 150 may then retrieve from rules storage 140 all rules relevant to the selected primitives. By applying each retrieved rule, actual index module may generate a security level for each security dimension. For example, actual index module 150 may initialize the security level for each security dimension to a value of zero and each retrieved rule may indicate an adjustment to one or more of the security levels.

Index representation module 160 may include hardware and/or executable instructions on a machine-readable storage medium configured to generate a representation of a security index for the system under evaluation. As will be described in further detail below with reference to FIG. 3, the security index representation may represent the values generated for each security dimension by both the reference index module 120 and the actual index module 150. Such representation may take the form of, for example, a Kiviat diagram. A person of skill in the art would realize that other representation forms may be used to convey the same or similar information.

In various alternative embodiments, index representation module 160 may additionally determine, for each security dimension, whether the security level for the dimension is less than one or more of the reference values for the security dimension. Index module 160 may then determine the gap between the security level and the one or more reference values for each security dimension whose security level is less than the one or more security values and present the user with a summary of the gaps. This summary may be, for example, a list of each security primitive and associated gap.

Having described the components of security evaluation system 100, a brief summary of the operation of security evaluation system 100 will be provided. It should be apparent that the following description is intended to provide an overview of the operation of security evaluation system 100 and is therefore a simplification in some respects. The detailed operation of security evaluation system 100 will be described in further detail below in connection with FIGS. 3-7.

According to various exemplary embodiments, security evaluation system 100 may be configured to evaluate each of the eight dimensions defined by ITU-T X.805 on all planes and layers. Thus, security evaluation system 100 may evaluate eight security dimensions. A user may begin the evaluation of a system currently under design by selecting, via user input module 110, a number of security primitives from primitives storage 120 that describe the features to be implemented on the system. Actual index module 150 may then receive the list of selected primitives from user input module 110 and locate all relevant rules from rules storage 140. Actual index module may then evaluate each relevant rule to determine a security level for each of the eight security dimensions.

Independently of the steps taken by reference index module 120, reference index module 120 may generate reference values for each of the eight security dimensions being evaluated by, for example, reading a data file containing the results of a security evaluation performed on a previous version of the system under evaluation. Finally, index representation module 160 may generate a report representing the reference and actual security levels for each of the eight security dimensions.

It should be noted that any number and combination of applicable security dimensions may be evaluated. Further, a security dimension may be evaluated for all planes and layers or for only a subset of planes and layers. As an example, an evaluation of a particular system may include a security index across four dimensions: Data Integrity across all planes and on all layers; Access Control on the Management plane and on all layers; Access Control on the End User plane and on the Services layer; and Privacy on all planes and on the Application and Services layers. The set of dimensions, layers, and planes to be evaluated may be designed into the system, explicitly specified by the user, or specified by a particular type of report selected by the user. For example, a user may select a "Standard Report" type to receive an evaluation of all eight security dimensions across all layers and planes.

Figure 2:
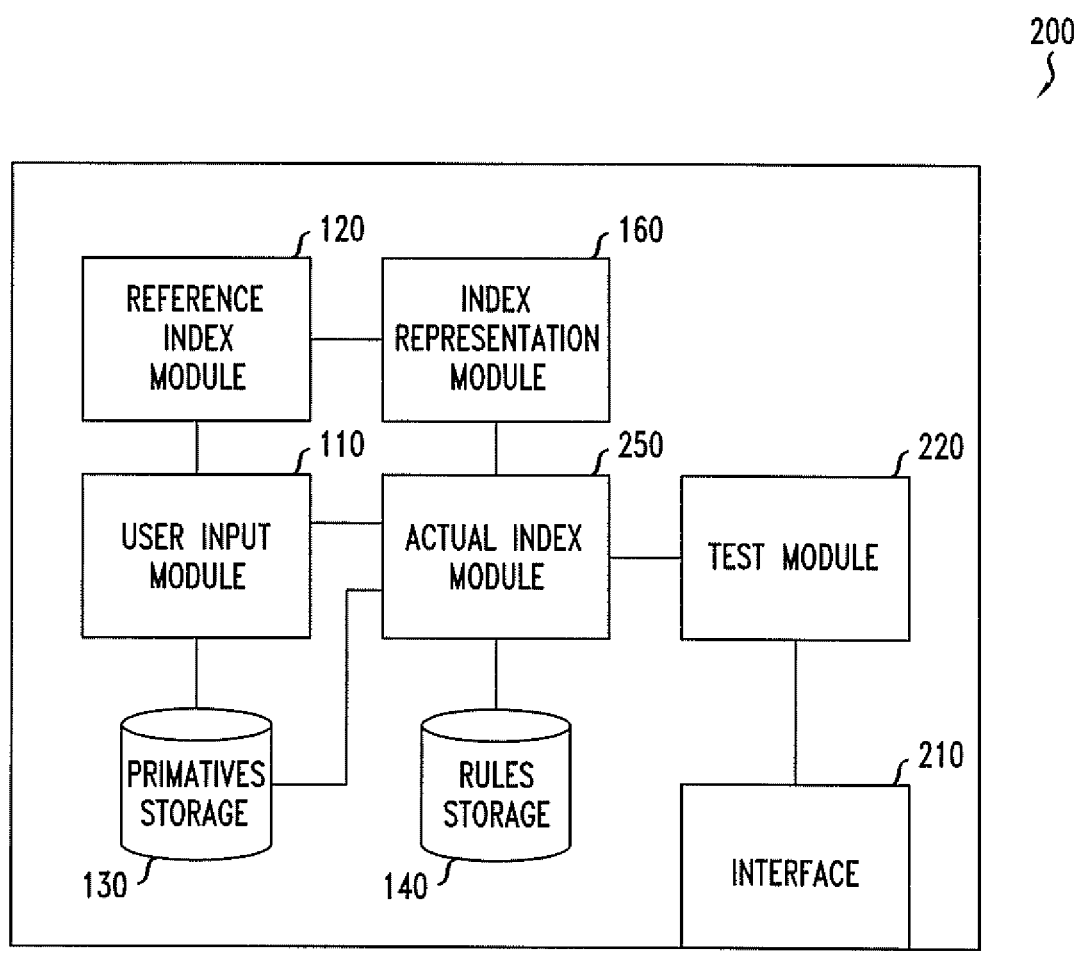
FIG. 2 is a schematic diagram of an alternative embodiment of a security evaluation system.

FIG. 2 is a schematic diagram of an alternative embodiment of a security evaluation system 200. Security evaluation system 200 may include a number of components similar to those included in security evaluation system 100 such as, for example, user input module 110, reference index module 120, primitives storage 130, rules storage 140, and index representation module 160. Security evaluation system 200 may also include a number of modified or additional components useful in evaluating the security of an implemented system, such as interface 210, test module 220, and actual index module 250.

Interface 210 may be an interface comprising hardware and/or executable instructions encoded on a machine-readable storage medium configured to communicate with an implemented system. Interface 210 may include a network interface for exchanging packets with the system under evaluation according to one or more communications and/or networking protocols such as, for example, HTTP, HTTPS, or BGP. Interface 210 may additionally or alternatively include other interfaces comprising hardware and/or executable instructions encoded on a machine-readable storage medium that may be used to communicate with the system under evaluation such as, for example, a Universal Serial Bus (USB), Firewire, or Small Computer System Interface (SCSI).

Test module 220 may include hardware and/or executable instructions on a machine-readable storage medium configured to execute a number of tests for evaluating the security of an implemented system. Test module 220 may perform each test on the system under evaluation by communicating with the system via interface 210. For example, test module 220 may use password cracking algorithms of various types or attempt various availability attacks in order to test the system's security among the dimensions to be tested. Test module 220 may include and/or utilize any combination of evaluation tools, whether commercially available or custom designed, for performing such tests.

Actual index module 250 may include hardware and/or executable instructions on a machine-readable storage medium configured to determine an actual security level for each of the security dimensions to be evaluated. In addition to the evaluations described above in connection with actual index module 150, actual index module 250 may evaluate the results of the tests performed by test module 220 and modify the security level of the relevant security dimensions appropriately. Evaluation of the test results may be performed in any manner known to those of skill in the art. For example, actual index module 250 may consult a separate set of rules (not shown) to determine the effect the possible result of each test may have on a security dimension. In various exemplary embodiments, actual index module 250 may additionally or alternatively use the results of each test performed to verify whether and to what extent at least one of the security primitives selected by the user is actually implemented.

It should be apparent that the foregoing embodiments are exemplary in nature and that other configurations are possible. For example, another alternative embodiment (not shown) may not make use of security primitives and, instead, evaluate each security dimension based solely on the results of a number of tests performed by a module similar to test module 220.

Figure 3:
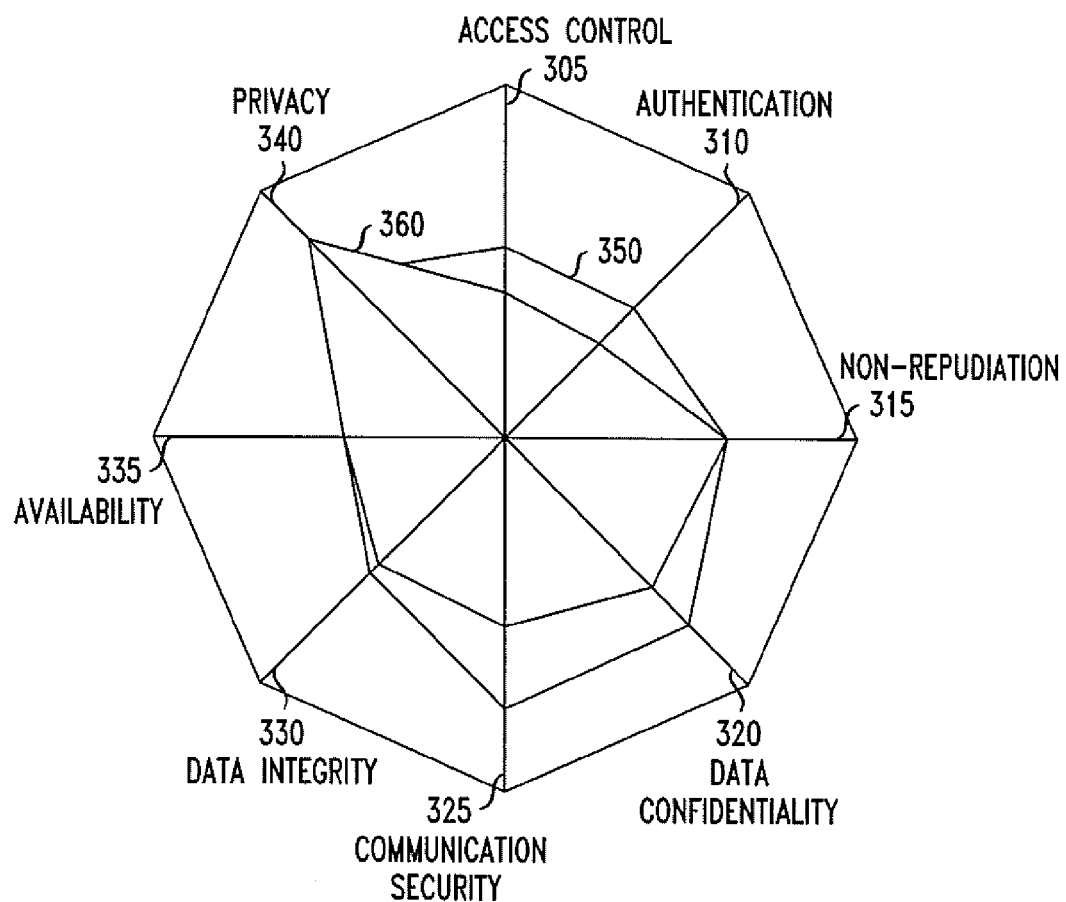
FIG. 3 is an exemplary security report generated by a security evaluation system.

FIG. 3 is an exemplary security report 300 generated by a security evaluation system 100. Security report 300 may include a Kiviat diagram having an axis 305, 310, 315, 320, 325, 330, 335, 340 for each security dimension that has been evaluated. In this example, axis 305 may represent the level of security with respect to Access Control, as defined by ITU-T X.805. Likewise, axis 310 may represent Authentication, axis 315 may represent Non-Repudiation, axis 320 may represent Data Confidentiality, axis 325 may represent Communication Security, axis 330 may represent Data Integrity, axis 335 may represent Availability, and axis 340 may Represent Privacy. Each axis may be scaled from 0 to 1, or according to any other appropriate scale.

Security report 300 may further include at least one reference index polygon 350 and a security index polygon 360. Reference index polygon 350 may represent the reference values of each security dimension as determined by reference index module 120. Reference index polygon 350 thus may represent, for example, the minimum acceptable security levels for the system under evaluation. Security index polygon 360 may represent the actual values of each security dimension as determined by actual index module 150.

By viewing security report 300, a user can quickly determine which aspects of a system's security are sufficiently secure and which aspects require increased security. In particular, security report 300 shows that, for the particular system associated with the report 300, Non-Repudiation, Availability, and Privacy are sufficiently secure with respect to reference polygon 350. Additionally, a small modification that increases the level of Data Integrity may be sufficient to bring that aspect up to acceptable levels as well. The report 300 further shows that considerable work must be done to increase the security levels of Access Control, Authentication, Data Confidentiality, and Communications Security before the security of the system as a whole is at an acceptable level.

FIG. 4 is a schematic diagram of an exemplary data arrangement 400 for storing a plurality of security primitives. Data arrangement 400 may be, for example, a table in a database stored in primitives storage 130. Alternatively, data arrangement 400 could be a series of linked lists, an array, or a similar data structure. Thus, it should be apparent that data arrangement 400 is an abstraction of the underlying data; any data structure suitable for storage of this data may be used.

Data arrangement 400 may include primitive ID field 405, title field 410, and description field 415. Primitive ID field 405 may be used to uniquely identify each primitive defined in data arrangement 400. Title field 410 may be used to indicate the name of each primitive. Description field 415 may be used to store a short description of the features represented by each primitive. As will be explained in further detail below with respect to FIG. 5, each primitive defined by a primitive record 420, 425, 430, 435, 440 may have varying effects on different security dimensions, planes, and/or layers.

As an example, primitive record 420 indicates that the "MD5 Checksum" primitive has unique ID "0" and represents the requirement that before being used, all data must match a previously calculated MD5 checksum. Likewise, primitive record 425 indicates that the "ID and Password" primitive has unique ID "1" and represents the requirement of identification and authentication for access to a system. Primitive record 430 indicates that the "ID Card" primitive has unique ID "2" and represents the requirement that the identity of each user must be verified by swiping a previously issued identification card. Primitive record 435 indicates that the "Data Encryption" primitive has unique ID "3" and represents the requirement that all data stored in a system be encrypted. Data arrangement 400 may contain numerous additional primitive records 440.

FIG. 5 is a schematic diagram of an exemplary data arrangement 500 for storing a plurality of security index rules. Data arrangement 500 may be, for example, a table in a database stored in rules storage 140. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include a rule ID field 505, a primitive ID field 510, a dimension field 515, and an effect field 520. Rule ID field 505 may be used to uniquely identify each rule defined in data arrangement 500. Primitive ID field 510 may be used to identify the primitive for which the rule is applied. Primitive ID field 510 may cross-reference with primitive ID field 405 of data arrangement 400. Dimension field 515 may identify the security dimension that the rule affects. Effect field 520 may indicate the specific effect a rule has on a security dimension.

As an example, rule record 525 indicates that a rule having unique ID "0" is applicable when the primitive having unique ID "0" (i.e., the "MD5 Checksum" primitive) has been selected. Rule record 525 specifies that when the "MD5 Checksum" primitive is selected, the security level of the Data Integrity dimension should be increased by 0.2. Thus, for example, if the "MD5 Checksum" primitive is the only selected primitive, the final evaluation of the Data Integrity dimension may be 0.2.

The selection of a primitive may have multiple effects on one or more security dimensions. As an example of this, rule records 530 and 535 represent rules having unique IDs "1" and "2," respectively, and are both applicable when the primitive having unique ID "1" (i.e., the "ID and Password" primitive) has been selected. Rule record 530 indicates that when the "ID and Password" primitive is selected, the security level of the Access Control dimension should be increased by 0.1. Rule record 535 indicates that when the "ID and Password" primitive is selected, the security level of the Authentication dimension should be increased by 0.15 as well. Thus, the selection of the "ID and Password" primitive has at least two distinct effects on the evaluated security index.

The effect of a selected security primitive may not always be a completely positive one. Rule records 540 and 545 illustrate this concept. Rule records 540 and 545 indicate that the rules having unique IDs "3" and "4," respectively, are both applicable when the primitive having unique ID "2" (i.e., the "ID Card" primitive) has been selected. While rule record 540 indicates that the selection of the "ID Card" primitive should increase the security level of the Authentication dimension by 0.15, rule record 545 indicates that the same primitive should decrease the security level of the Availability dimension by 0.05. Thus, the selection of the "ID Card" primitive may have two distinct and opposite effects on the evaluated security index. More generally, a primitive may constitute a tradeoff with regard to the security index, wherein it may have at least one positive effect and at least one negative effect, or even an overall negative effect on the security index, wherein it has only negative effects.

An effect may not necessarily be tied to the increase or decrease by a static or literal number. Instead, an effect may dependent on at least one other factor. As an example of this, rule records 550 and 555 indicate that the rules having unique IDs "5" and "6," respectively, are applicable when the primitive having unique ID "3" (i.e., the "Data Encryption" primitive) is selected. Record 550 indicates that when the "Data Encryption" primitive is selected, the security level of the Privacy dimension should be increased by a literal value of 0.05. In contrast, record 555 indicates that when the "Data Encryption" primitive is selected, the security level of the Data Confidentiality dimension should be increased by a variable amount.

As explained above with regard to FIG. 1, various embodiments allow for the entry of an implementation level for at least a subset of the available primitives. As rule record 555 illustrates, this implementation level may be used in determining the effect the security primitive has on the security index. Record 555 shows that when the "Data Encryption" primitive is selected, the security level of the Data Confidentiality dimension should be increased by 0.4 times the level to which the "Data Encryption" primitive has been or is to be implemented. Thus, if the user has indicated an implementation level of 10% for the "Data Encryption" primitive (indicating, for example, substitution cipher encryption), the security level of the "Data Confidentiality" dimension may be increased by only 0.04. On the other hand, if the user has indicated an implementation level of 100% for the "Data Encryption" primitive (indicating, for example, RSA encryption), the security level of the "Data Confidentiality" dimension may be increased by 0.4.

The effect of a rule on a security dimension may be dependent on factors other than or in addition to the level of implementation. For example, a rule may take into account whether or not a different primitive has been selected and to what level it has been implemented. Thus, the selection of one security primitive may reduce, increase, or even remove the effect resulting from the selection of another security primitive.

Other factors useful in determining the effect of a primitive on a security dimension will be apparent to those of skill in the art.

Data arrangement 500 may contain numerous additional rule records 560.

Figure 6:
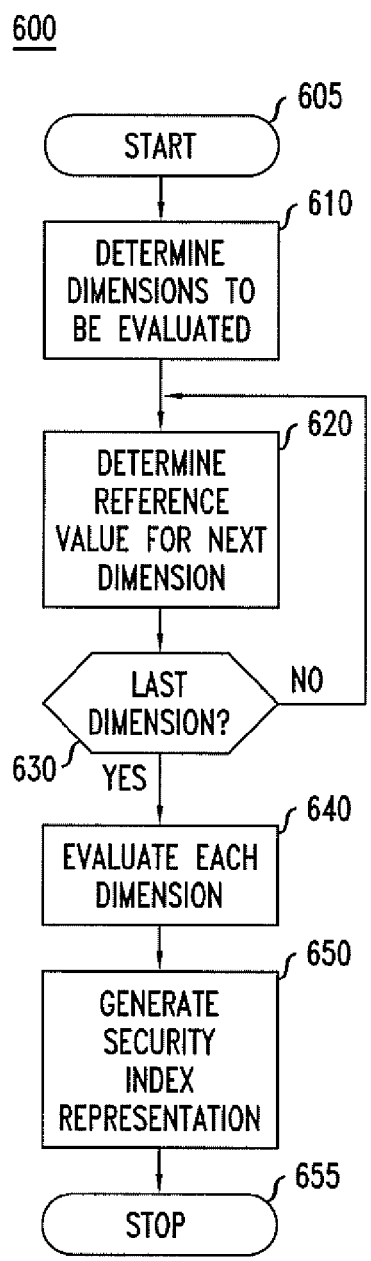
FIG. 6 is a flowchart of an exemplary method for generating a security index to convey the security level of a system.

FIG. 6 is a flowchart of an exemplary method 600 for generating a security index to convey the security level of a system. Method 600 may be performed, for example, by the components of security evaluation system 100 or 200 to generate a security index for a system under evaluation. Other suitable components for execution of method 600 will be apparent to those of skill in the art. The security dimensions available for evaluation may include those dimensions defined by ITU-T X-805 and/or other security dimensions defined by the system designer, operator, another specification, or elsewhere.

Method 600 may begin in step 605 and proceed to step 610 where security evaluation system 100 or 200 may determine which security dimensions should be evaluated. As previously described in relation to FIG. 1, the dimensions to be evaluated may be, for example, predetermined, explicitly selected by the user, or associated with a report type selected by a user. Other methods of determining the dimensions to be evaluated will be apparent to those of skill in the art.

Method 600 may then proceed to step 620 where security evaluation system 100 or 200 may determine a reference value for the next security dimension to be evaluated. In the case of the first execution of step 620, security evaluation system 100 or 200 may select the first security dimension to be evaluated and determine a reference value. As previously described in relation to FIG. 1, each reference value may be, for example, predetermined, explicitly set by a user, associated with a report type selected by a user, or based on a previously run report. Other methods of determining a reference value for a security dimension will be apparent to those of skill in the art.

Method 600 may then proceed to step 630, where security evaluation system 100 or 200 may determine whether a reference value has been determined for the last security dimension to be evaluated. If there is still at least one security dimension that for which a reference value has not been determined, method 600 may loop back to step 620 where a reference value will be determined for the next security dimension.

Once at least one reference value has been generated for each security dimension to be evaluated, method 600 may proceed to step 640, where security evaluation system 100 or 200 may evaluate each security dimension for the system under evaluation. Security evaluation system 100 or 200 may evaluate each dimension using methods such as applying rules associated with primitives selected by the user or performing security tests on a system under evaluation. Other methods of evaluating each security dimension will be apparent to those of skill in the art. An exemplary method of evaluating security dimensions is described in further detail below with reference to FIG. 7.

Method 600 may then proceed to step 650 where security evaluation system 100 or 200 may generate a security index representation to display to the user. For example, security evaluation system 100 or 200 may generate a Kiviat diagram showing the reference and actual security levels for the system under evaluation, as described above with reference to FIG. 3. Other methods of communicating reference and measured/estimated values for a number of dimensions will be apparent to those of skill in the art. Security evaluation system 100 or 200 may also scale each axis or similar component of the representation based on the maximum attainable security level or some other value. Alternatively, security evaluation system 100 or 200 may scale the security level values themselves based on the maximum attainable security level or some other value to obtain a value, for example, between 0.0 and 1.0, inclusive. Method 600 may then end in step 655.

Figure 7:
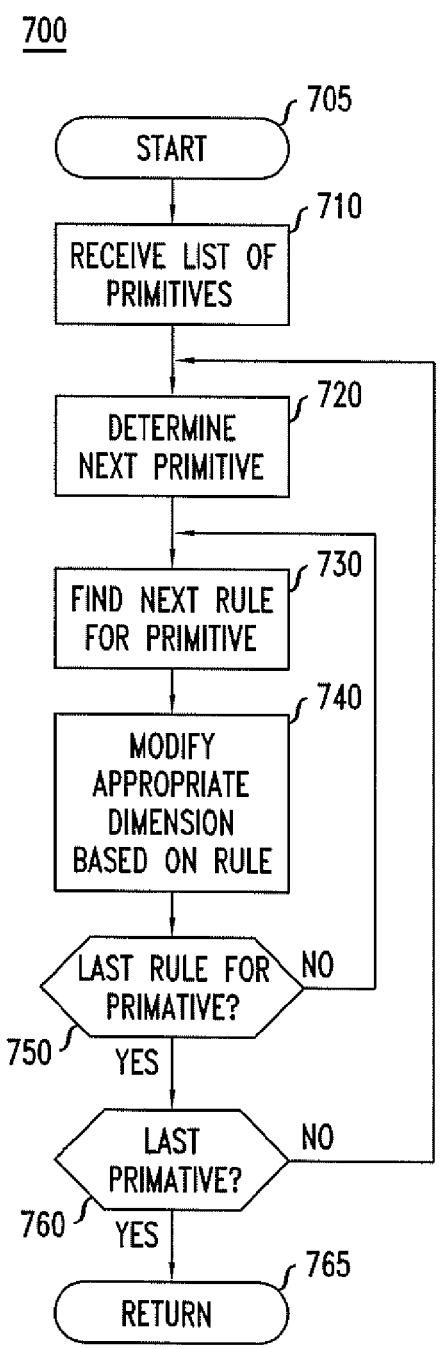
FIG. 7 is a flowchart of an exemplary method for evaluating a number of security dimensions for a system.

FIG. 7 is a flowchart of an exemplary method 700 for evaluating a number of security dimensions for a system. Method 700 may be performed, for example, by the components of security evaluation system 100 or 200 to evaluate at least one security dimension for a system under evaluation. Other suitable components for execution of method 600 will be apparent to those of skill in the art. Method 700 may correspond to step 640 of method 600.

Method 700 may begin in step 705 and proceed to step 710 where security evaluation system 100 or 200 may receive the selection of a number of security primitives from a user via user input module 110. Method 700 may then move to step 720 where security evaluation system 100 or 200 may select the next primitive from the list of selected primitives. In the case of the first execution of step 720, security evaluation system 100 or 200 may select the first primitive from the list of selected primitives.

After selecting a primitive to interpret, method 700 may proceed to step 730 where security evaluation system 100 or 200 may locate a next rule associated with the primitive in rules storage 140. In the case of the first execution of step 730 after the last execution of step 720 (i.e., the first selection of a rule after the selection of a new primitive to interpret), security evaluation system 100 or 200 may select the first rule associated with the primitive. Method 700 may then proceed to step 740 where security evaluation system 100 or 200 may apply the rule. Application of the rule may include increasing or decreasing the security level of at least one dimension by a literal value or another value dependent on other factors such as, for example, an implementation level or whether another specific primitive was selected. Other useful modifications to a security level will be apparent to those of skill in the art.

Once the rule has been applied, method 700 may proceed to step 750 where security evaluation system 100 or 200 may determine whether any rules associated with the current primitive have not yet been applied. If there are still unapplied rules associated with the current primitive, method 700 may loop back to step 730 where security evaluation system 100 or 200 may proceed to locate and apply the next rule associated with the current primitive. If all rules have been evaluated for the primitive, method 700 may proceed to step 760.

At step 760, security evaluation system 100 or 200 may determine whether all selected primitives have been interpreted. If not, method 700 may loop back to step 720 where security evaluation system 100 or 200 may proceed to interpret the next security primitive. If all primitives have been interpreted, however, method 700 may end in step 765.

According to the foregoing, various exemplary embodiments provide for an effective method of evaluating the security of a system. In particular, by evaluating the security of a system across multiple dimensions and presenting a security index to the user, the particular strengths and weaknesses of a systems security can be communicated in an intuitive manner. Further, by displaying reference values for each security dimension as well, the user gains a heightened understanding of the strengths and weaknesses of a system as well as an indication as to which areas of security require improvement.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine. Thus, a machine-readable storage medium may include read-only memory (ROM), random-access memory (RAM), magnetic disk storage media, optical storage media, flash-memory devices, and similar storage media.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of evaluating the security of a target system by a security evaluation system, the method comprising:
   determining, at the security evaluation system, a plurality of security dimensions to be evaluated for the target system;
   determining a reference value for each of the plurality of security dimensions, wherein each reference value is representative of a target value for the associated security dimension of the target system;
   evaluating the security of the target system to generate an actual value for each of the plurality of security dimensions;
   generating a security index representation that displays the reference value and the actual value of each of the plurality of security dimensions for the target system;
   for each security dimension of the plurality of security dimensions:
      determining whether the actual value for the security dimension is less than a reference value for the security dimension,
      when the actual value for the security dimension is less than a reference value for the security dimension, determining a gap for the security dimension by determining the difference between the reference value for the security dimension and the actual value for the security dimension; and
   generation and displaying a gap summary, wherein the gap summary lists each gap.

2. The method of claim 1, further comprising establishing a knowledge base of security primitives and effects of each security primitive on at least one of the plurality of security dimensions,
   wherein the step of evaluating the security of the target system comprises:
      receiving a selection of a plurality of selected security primitives, and
      for each of the plurality of selected security primitives, modifying the actual value of at least one security dimension of the plurality of security dimensions based on the effect of the selected security primitive on the at least one security dimension.

3. The method of claim 1, wherein, when the target system is an implemented system, the step of evaluating the security of the target system comprises:
   conducting a series of tests on the target system; and
   for each test of the series of tests, modifying the actual value of at least one security dimension of the plurality of security dimensions based on the result of the test.

4. The method of claim 1, wherein the security index representation is a Kiviat diagram having a number of axes equal to the number of security dimensions of the plurality of security dimensions.

5. The method of claim 1, wherein the target system comprises a plurality of security layers and the step of evaluating the security of the target system comprises:
   for at least one security dimension of the plurality of security dimensions, evaluating the security dimension for a subset of the plurality of security layers.

6. The method of claim 1, wherein the target system comprises a plurality of security planes and the step of evaluating the security of the target system comprises:
   for at least one security dimension of the plurality of security dimensions, evaluating the security dimension for a subset of the plurality of security planes.

7. A security evaluation system for evaluating the security of a target system, the security evaluation system comprising:
   a primitives storage that stores a plurality of available security primitives;
   a rules storage that stores a plurality of rules for determining the effect each security primitive of the plurality of primitives has on at least one security dimension of a plurality of security dimensions;
   a reference index module that generates a reference value for each security dimension of the plurality of security dimensions, wherein each reference value is a target minimum value for the associated security dimension;
   a user input module that receives a selection of a plurality of selected security primitives of the plurality of available security primitives;
   an actual index module that determines an actual value for each security dimension by:
      for each selected primitive of the plurality of selected primitives, accessing the rules storage to locate at least one rule of the plurality of rules relevant to the selected primitive, and
      adjusting the actual value of at least one security dimension of the plurality of selected security dimensions according to the at least one rule; and
   an index representation module that:
      creates a representation that displays the reference value and the actual value of each of the plurality of security dimensions for the target system,
      for each security dimension of the plurality of security dimensions:
         determines whether the actual value of the security dimension is less than a reference value for security dimension,
         when the actual value of the security dimension is less than a reference value for the security dimension, determines a gap for the security dimension by determining the difference between the reference value for the security dimension and the actual value for the security dimension; and
      generates and displays a gap summary, wherein the gap summary lists each gap.

8. The security evaluation system of claim 7, further comprising a test module that, when the target system is an implemented system, performs at least one security test on the target system, wherein, in determining an actual value for each security dimension, the actual index module evaluates at least one result of the at least one security test performed by the test module.

9. The security evaluation system of claim 7, wherein the representation is a Kiviat diagram having a number of axes equal to the number of security dimensions of the plurality of security dimensions.

10. The security evaluation system of claim 7, wherein:
the target system comprises a plurality of security layers, and
in determining an actual value for each security dimension, the actual index module evaluates at least one security dimension of the plurality of security dimensions for a subset of the plurality of security layers.

11. The security evaluation system of claim 7, wherein:
the target system comprises a plurality of security planes, and
in determining an actual value for each security dimension, the actual index module evaluates at least one security dimension of the plurality of security dimensions for a subset of the plurality of security planes.

12. A non-transitory machine-readable storage medium encoded with instructions for evaluating the security of a target system, the machine-readable storage medium comprising:
instructions for determining a plurality of security dimensions to be evaluated for the target system;
instructions for determining a reference value for each of the plurality of security dimensions, wherein each reference value is representative of a minimum target value for the associated security dimension of the target system;
instructions for evaluating the security of the target system to generate an actual value for each of the plurality of security dimensions;
instructions for generating a security index representation that displays the reference value and the actual value of each of the plurality of security dimensions for the target system;
instructions for, for each security dimension of the plurality of security dimensions:
determining whether the actual value for the security dimension is less than a reference value for the security dimension,
when the actual value for the security dimension is less than a reference value for the security dimension, determining a gap for the security dimension by determining the difference between the reference value for the security dimension and the actual value for the security dimension; and
instructions for generating and displaying a gap summary, wherein the gap summary lists each gap.

13. The non-transitory machine-readable storage medium of claim 12, further comprising instructions for establishing a knowledge base of security primitives and the effects of each security primitive on at least one of the plurality of security dimensions,
wherein the instructions for evaluating the security of the target system comprise:
instructions for receiving a selection of a plurality of selected security primitives, and
instructions for modifying, for each of the plurality of selected security primitives, the actual value of at least one security dimension of the plurality of security dimensions based on the effect of the selected security primitive on the at least one security dimension.

14. The non-transitory machine-readable storage medium of claim 12, wherein the instructions for evaluating the security of the target system comprise, when the target system is an implemented system:
instructions for conducting a series of tests on the target system; and
instructions for modifying, for each test of the series of tests, the actual value of at least one security dimension of the plurality of security dimensions based on the result of the test.

15. The non-transitory machine-readable storage medium of claim 12, wherein the security index representation is a Kiviat diagram having a number of axes equal to the number of security dimensions of the plurality of security dimensions.

16. The non-transitory machine-readable storage medium of claim 12, wherein the target system comprises a plurality of security layers and the instructions for evaluating the security of the target system comprise:
instructions for evaluating, for at least one security dimension of the plurality of security dimensions, the security dimension for a subset of the plurality of security layers.

17. The non-transitory machine-readable storage medium of claim 12, wherein the target system comprises a plurality of security planes and the instructions for evaluating the security of the target system comprise:
instructions for evaluating, for at least one security dimension of the plurality of security dimensions, the security dimension for a subset of the plurality of security planes.

* * * * *